(12) United States Patent
Kohli et al.

(10) Patent No.: US 8,114,180 B2
(45) Date of Patent: Feb. 14, 2012

(54) BAG FILTER COMPRISING SCRIMLESS FILTER FELT OF META-AND-PARA-ARAMID STAPLE FIBER

(75) Inventors: Anil Kohli, Midlothian, VA (US); Kurt Hans Wyss, Chavannes De Bogis (CH)

(73) Assignee: E. I. du Pont de Nemours and Company, Wilmington, DE (US)

( * ) Notice: Subject to any disclaimer, the term of this patent is extended or adjusted under 35 U.S.C. 154(b) by 323 days.

(21) Appl. No.: 12/505,780

(22) Filed: Jul. 20, 2009

(65) Prior Publication Data

US 2011/0011043 A1    Jan. 20, 2011

(51) Int. Cl.
    *B01D 46/02*    (2006.01)
(52) U.S. Cl. ............................. 55/381; 55/528
(58) Field of Classification Search .............. 55/381, 55/527; 95/273; 66/190, 191, 194, 202; 210/452, 503, 504, 505, 506, 507, 508; 442/312, 442/313, 314; 428/102
See application file for complete search history.

(56) References Cited

U.S. PATENT DOCUMENTS

| | | |
|---|---|---|
| 2,910,763 A | 11/1959 | Lauterbach |
| 3,063,966 A | 11/1962 | Kwoleck |
| 3,227,793 A | 1/1966 | Cipriani |
| 3,287,324 A | 11/1966 | Sweeny |
| 3,414,645 A | 12/1968 | Morgan |
| 3,524,304 A | 8/1970 | Wittemeier et al. |
| 3,684,284 A | 8/1972 | Taranfield |
| 3,767,756 A | 10/1973 | Blades |
| 3,869,429 A | 3/1975 | Blades |
| 3,869,430 A | 3/1975 | Blades |
| 4,056,374 A | 11/1977 | Hixenbaugh |
| 4,100,323 A | 7/1978 | Forsten |
| 4,117,578 A | 10/1978 | Forsten |
| 4,310,336 A | 1/1982 | Peterson |
| 4,481,022 A | 11/1984 | Reier |
| 4,490,253 A | 12/1984 | Tafara |
| 4,536,439 A | 8/1985 | Forsten |
| 4,585,833 A | 4/1986 | Domeier |
| 4,668,234 A | 5/1987 | Vance et al. |
| 4,755,335 A | 7/1988 | Ghorashi |
| 4,883,496 A | 11/1989 | Ghorashi |
| 5,096,459 A | 3/1992 | Ghorashi |
| 5,288,536 A * | 2/1994 | Zafiroglu ...................... 428/102 |
| 5,667,743 A | 9/1997 | Tai et al. |
| 7,344,035 B1 * | 3/2008 | Koopmann et al. ........... 210/503 |
| 2004/0123574 A1 | 7/2004 | Wilkins et al. |
| 2005/0274152 A1* | 12/2005 | Koopmann et al. ............. 66/194 |
| 2008/0011669 A1* | 1/2008 | Morgan ........................ 210/452 |
| 2009/0301304 A1* | 12/2009 | Bass et al. ....................... 95/273 |

OTHER PUBLICATIONS

PCT International Serach Report and Written Opinion for International Application No. PCTUS2010/042552 dated Dec. 8, 2010.
Nomex "Delta K": a new fibre blend for better air pollution control, Switzerland, 1993.

* cited by examiner

*Primary Examiner* — Duane Smith
*Assistant Examiner* — Minh-Chau Pham

(57) ABSTRACT

This invention relates to a bag filter having a tubular section, a closed end, and an open end; the tubular section comprising a scrimless filter felt consisting essentially of a needle-punched batt of an intimate blend of fibers consisting of 50 to 79 percent by weight meta-aramid staple fiber, and 21 to 50 percent by weight para-aramid staple fiber; said needle-punched batt having a basis weight of from 10 to 17 ounces per square yard (340 to 580 grams per square meter).

8 Claims, 3 Drawing Sheets

BAG FILTER COMPRISING SCRIMLESS FILTER FELT OF META-AND-PARA-ARAMID STAPLE FIBER

BACKGROUND OF THE INVENTION

1. Field of the Invention

This invention relates to high-temperature-service bag filters having improved filtration performance.

2. Description of Related Art

Filter felts and bag filters for hot gas filtration containing aramid staple fibers, such as disclosed in U.S. Pat. Nos. 4,100,323 and 4,117,578 to Forsten can be used to protect the environment from particulate matter from asphalt plants, coal plants, and other industrial concerns. Due to the high potential environmental impact from such plants and the extreme chemical environment the filters must endure, any improvement that has the potential to improve filtration efficiency is desired.

In particular, the trend in the industry is for more portable asphalt manufacturing facilities and associated bag houses that can be operated where paving of roads is needed. These portable bag houses are generally more compact and use smaller bags on the order of about 3.5 meters in length, versus older larger bags of about 6 meters in length. Therefore there is a need for a filter bag that can provide improved performance at lower filter bag weight.

BRIEF SUMMARY OF THE INVENTION

This invention relates to a bag filter having a tubular section, a closed end, and an open end; the tubular section comprising a scrimless filter felt consisting essentially of a needle-punched batt of an intimate blend of fibers consisting of 50 to 79 percent by weight meta-aramid staple fiber, and 21 to 50 percent by weight para-aramid staple fiber; said needle-punched batt having a basis weight of from 10 to 17 ounces per square yard (340 to 580 grams per square meter).

DETAILED DESCRIPTION OF THE INVENTION

Figure 1:
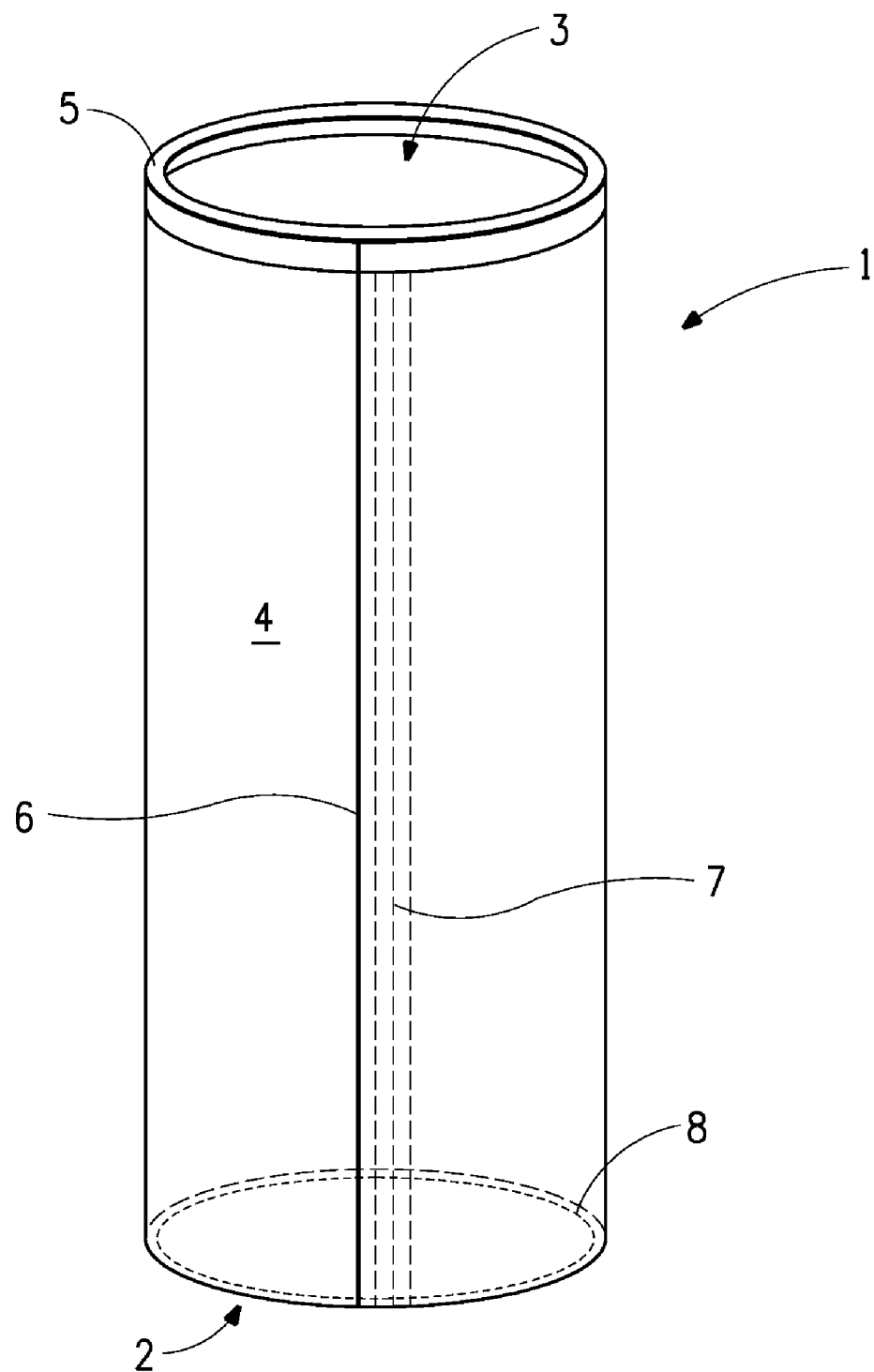
FIG. 1 illustrates one embodiment of a bag filter having a scrimless filter felt.

In one embodiment, this invention concerns a bag filter having a tubular section comprising a scrimless filter felt consisting essentially of a needle-punched batt of an intimate blend of fibers consisting of 50 to 79 percent by weight meta-aramid staple fiber and 21 to 50 percent by weight para-aramid staple fiber. This scrimless filter felt has surprising filtration efficiency performance when compared to 100% meta-aramid filter felts.

By "scrimless filter felt" it is meant the filter felt is stable to mechanical working, such as would be experienced by a bag filter in a hot gas filtration bag house from air pressure fluctuations and does not require or have attached any type of supporting fabric scrim. The scrimless filter felt consists essentially of a needle-punched batt of fibers. The batt of fibers can be obtained from conventional nonwoven sheet forming processes such as air-laying or carding, and in some embodiments layers of un-needled fibers are crosslapped using conventional techniques to form thick fiber batts of sufficient basis weight necessary for felts. The fiber batt is then consolidated into a scrimless filter felt via needlepunching uses processes such as disclosed in U.S. Pat. Nos. 2,910,763 and 3,684,284, which are examples of methods known in the art that are useful in the manufacture of the nonwoven fabrics and felt.

The batt of staple fibers consists of an intimate blend of 50 to 79 percent by weight meta-aramid staple fiber and 21 to 50 percent by weight para-aramid staple fiber. In some embodiments, the batt of staple fibers consists of an intimate blend of 50 to 68 percent by weight meta-aramid staple fiber and 32 to 50 percent by weight para-aramid staple fiber. In preferred embodiments both the meta- and para-aramid staple fibers are crimped, with both having a crimp frequency of 7 to 14 crimps per inch (2.5 to 5.5 crimps per cm). The staple fibers are disposed in the batt and scrimless felt as an intimate blend, meaning that the types of staple fibers are uniformly mixed and distributed in the batt and felt. This forms a uniform mixture in the felt so as to avoid any localized areas having a high concentration of any one type of fiber in any one portion of the felt.

The intimate staple fiber blend can be formed by many methods. For example, in one embodiment, clumps of crimped staple fibers obtained from bales of different types of staple fibers can be opened by a device such as a picker and then blended by any available method, such as air conveying, to form a more uniform mixture. In an alternative embodiment, the staple fibers can be blended to form a mixture prior to fiber opening in the picker. In still another possible embodiment the staple fibers may be cutter blended, that is, tows of the fiber types can be combined and then cut into staple. The blend of fibers can then be converted into a nonwoven felt. In one embodiment, this involves forming a fibrous web by use of a device such as a card, although other methods, such as air-laying of the fibers can be used. If desired, the fibrous web can then be sent via conveyor to a device such as a crosslapper to create a crosslapped structure by layering individual webs on top of one another in a zig-zig structure. If desired, the heavy basis weight needle-punched batt of staple fibers can be made from two or more lightly consolidated lower basis weight batts. For example, the lower basis weight batts can be lightly tacked or lightly consolidated on a standard needle punch machine and then two or more of these lower basis weight batts can be then combined and attached to each other by needle-punching them together on both sides to produce a filtration felt.

The scrimless filter felt consists of a blend of aramid fibers because these fibers are particularly useful in the filtration of high temperature gases, for example at 175° C. or more. Fibers such as polyesters are not useful at high temperatures due to their relatively low glass transition temperatures (about 150° C.), meaning that the mechanical integrity of the fiber and a filter bag will be compromised when the glass transition temperature is exceeded. Even a small quantity of polyester fiber (or other material having a relatively low glass transition temperature) in the filter media of a filter bag can compromise performance at high temperatures. Aramid fibers have glass transition temperatures in excess of 200° C. and therefore are significantly more mechanically stable at higher temperatures than polyesters and can withstand temperature excursions in excess of 200° C., which would damage a polyester-containing bag.

The meta-aramid fiber includes meta-oriented synthetic aromatic polyamides and the para-aramid fiber includes para-oriented synthetic aromatic polyamides. The polymers must be of fiber-forming molecular weight in order to be shaped into fibers. The polymers can include polyamide homopolymers, copolymers, and mixtures thereof which are predominantly aromatic, wherein at least 85% of the amide (—CON—) linkages are attached directly to two aromatic rings. The rings can be unsubstituted or substituted. The polymers are meta-aramid when the two rings or radicals are meta oriented with respect to each other along the molecular chain; the polymers are para-aramid when the two rings or radicals are para oriented with respect to each other along the molecular chain. Preferably, copolymers have no more than 10 percent of other diamines substituted for a primary diamine used in forming the polymer or no more than 10 percent of other diacid chlorides substituted for a primary diacid chloride used in forming the polymer. Additives can be used with the aramid; and it has been found that up to as much as 10 percent by weight of other polymeric material can be blended or bonded with the aramid. The preferred meta-aramid is poly (meta-phenylene isophthalamide) (MPD-I). One such meta-aramid fiber is Nomex® aramid fiber available from E. I. du Pont de Nemours and Company of Wilmington, Del. (DuPont), however, meta-aramid fibers are available in various styles under the trademarks Tejinconex®, available from Teijin Ltd. of Tokyo, Japan; New Star® Meta-aramid, available from Yantai Spandex Co. Ltd, of Shandong Province, China; and Chinfunex® Aramid 1313 available from Guangdong Charming Chemical Co. Ltd., of Xinhui in Guangdong, China. Meta-aramid fibers are inherently flame resistant and can be spun by dry or wet spinning using any number of processes; however, U.S. Pat. Nos. 3,063,966; 3,227,793; 3,287,324; 3,414,645; and 5,667,743 are illustrative of useful methods for making aramid fibers that could be used in this invention.

In one embodiment, the meta-aramid fiber has a degree of crystallinity of of at least 20% and more preferably at least 25%. For purposes of illustration due to ease of formation of the final fiber, a practical upper limit of crystallinity is 50% (although higher percentages are considered suitable). Generally, the crystallinity will be in a range from 25 to 40%. An example of a commercial meta-aramid fiber having this degree of crystallinity is Nomex® T450 available from E. I. du Pont de Nemours & Company of Wilimington, Del.

The degree of crystallinity of an meta-aramid fiber can be determined by one of two methods. The first method is employed with a non-voided fiber while the second is on a fiber that is not totally free of voids.

The percent crystallinity of meta-aramids in the first method is determined by first generating a linear calibration curve for crystallinity using good, essentially non-voided samples. For such non-voided samples the specific volume (1/density) can be directly related to crystallinity using a two-phase model. The density of the sample is measured in a density gradient column. A meta-aramid film, determined to be non-crystalline by x-ray scattering methods, was measured and found to have an average density of 1.3356 g/cm³. The density of a completely crystalline meta-aramid sample was then determined from the dimensions of the x-ray unit cell to be 1.4699 g/cm³. Once these 0% and 100% crystallinity end points are established, the crystallinity of any non-voided experimental sample for which the density is known can be determined from this linear relationship:

$$\text{Crystallinity} = \frac{(1/\text{non-crystalline density}) - (1/\text{experimental density})}{(1/\text{non-crystalline density}) - (1/\text{fully-crystalline density})}$$

Since many fiber samples are not totally free of voids, Raman spectroscopy is the preferred method to determine crystallinity. Since the Raman measurement is not sensitive to void content, the relative intensity of the carbonyl bond stretch at 1650 cm⁻¹ can be used to determine the crystallinity of a meta-aramid in any form, whether voided or not. To accomplish this, a linear relationship between crystallinity and the intensity of the carbonyl bond stretch at 1650 cm⁻¹, normalized to the intensity of the ring stretching mode at 1002 cm⁻¹, was developed using minimally voided samples whose crystallinity was previously determined and known from density measurements as described above. The following empirical relationship, which is dependent on the density calibration curve, was developed for percent crystallinity using a Nicolet Model 910 FT-Raman Spectrometer:

$$\% \text{ Crystallinity} = \frac{100.0 \times (I(1650 \text{ cm}^{-1}) - 0.2601)}{0.1247}$$

where $I(1650 \text{ cm}^{-1})$ is the Raman intensity of the meta-aramid sample at that point. Using this intensity the percent crystallinity of the experiment sample is calculated from the equation.

Meta-aramid fibers, when spun from solution, quenched, and dried using temperatures below the glass transition temperature, without additional heat or chemical treatment, develop only minor levels of crystallinity. Such fibers have a percent crystallinity of less than 15 percent when the crystallinity of the fiber is measured using Raman scattering techniques. These fibers with a low degree of crystallinity are considered amorphous meta-aramid fibers that can be crystallized through the use of heat or chemical means. The level of crystallinity can be increased by heat treatment at or above the glass transition temperature of the polymer. Such heat is typically applied by contacting the fiber with heated rolls under tension for a time sufficient to impart the desired amount of crystallinity to the fiber.

The level of crystallinity of m-aramid fibers can be increased by a chemical treatment, and in some embodiments this includes methods that color, dye, or mock dye the fibers prior to being incorporated into a fabric. Some methods are disclosed in, for example, U.S. Pat. Nos. 4,668,234; 4,755,335; 4,883,496; and 5,096,459. A dye assist agent, also known as a dye carrier may be used to help increase dye pick up of the aramid fibers. Useful dye carriers include aryl ether, benzyl alcohol, or acetophenone.

The preferred para-aramid is poly (para-phenylene terephthalamide) (PPD-T). One such para-aramid fiber is Kevlar® aramid fiber available from DuPont, however, para-aramid fibers are also available under the trademark Twaron®, available from Teijin Ltd. of Tokyo, Japan. For the purposes herein, Technora® fiber, which is also available from Teijin Ltd. of Tokyo, Japan, and is made from copoly(p-phenylene/ 3,4'diphenyl ester terephthalamide), is considered a para-aramid fiber. Methods for making para-aramid fibers are generally disclosed in, for example, U.S. Pat. Nos. 3,869,430; 3,869,429; and 3,767,756.

The scrimless filter felt essentially consists of a needle-punched batt of an intimate blend of fibers and is said to be scrimless because it is not further attached to any supporting scrim such as a lightweight woven fabric. Generally such scrims are used to provide mechanical integrity and durability to the filter felt. Therefore construction of a filter felt without a scrim requires imparting certain mechanical features into the felt that will allow it to withstand the rigors of being fabricated into filter bags and being exposed to hot gases and pressure fluctuations in hot gas bag houses. The needle-punched batt has a basis weight of from 10 to 17 ounces per square yard (340 to 580 grams per square meter). Scrimless filter felts of less than 10 oz/yd$^2$ (340 g/m$^2$) tend to not have adequate stability to mechanical working and can fail prematurely when used as bag filter material in hot gas filtration bag houses. The pressure drop across the scrimless filter felt increases with basis weight, therefore filter felt basis weights greater than 17 oz/yd$^2$ (580 g/m$^2$) are generally not desired.

In some embodiments, the needle-punched batt is needled such that the batt has about 4200 to 7200 total penetrations per square inch (650 to 1116 total penetrations per square centimeter). In one practical embodiment, these penetrations are divided about equally on both sides of the needle-punched batt. That is, for 4200 total penetrations/in$^2$ (650 total penetrations/cm$^2$), the batt is consolidated such that about 2100 needle penetrations/in$^2$ (325 penetrations/cm$^2$) are applied to the batt from one side or face of the batt with an essentially equal number applied to the other side or face of the batt. Likewise, for 7200 total penetrations/in$^2$ (1116 total penetrations/cm$^2$), 3600 needle penetrations/in$^2$ (558 penetrations/cm$^2$) are applied to the batt from one face with an essentially equal number applied to the other face. It is believed that for those embodiments where improved durability of the scrimless filter felt is important, at least about 4200 total penetrations/in$^2$ (650 total penetrations/cm$^2$) are needed, since no scrim is present in the felt. Consolidation of the batt of fibers in excess of about 7200 total penetrations/in$^2$ (1116 total penetration s/cm$^2$) is considered undesirable because of the excess compaction of the felt, causing high pressure drops across the felt.

In some embodiments, the scrimless filter felt has a filtration efficiency per ASTM 6830-02, as measured by the total mass of the mean outlet particle concentration through the felt, of 0.02 to 0.5 milligrams per dry standard cubic meter of air. In some other embodiments, the total mass of the mean outlet particle concentration through the felt is 0.05 to 0.4 milligrams per dry standard cubic meter of air. This is an exceedingly low amount of leakage for a scrimless filter felt and in general is less than half the amount seen with a scrimless filter felt of equivalent basis weight that contains only meta-aramid fiber. In some embodiments, the scrimless filter felt has a leakage in milligrams per cubic meter per VDI 3926 of from 0.1 to 0.4 mg/m$^3$; in some embodiments the scrimless filter felt has a leakage per VDI 3926 of from 0.1 to 0.25 mg/m$^3$. VDI is Verein Deutscher Ingenieure (The Association of German Engineers).

FIG. 1 illustrates one embodiment of the filter bag comprising the scrimless filter felt. Filter bag 1 has a closed end 2, an open end 3, and a tubular section 4. In the embodiment represented, the filter bag also has a snap ring 5 attached to the open end of the bag. The snap ring can be made of spring steel or any other suitable material. The tubular section 4 of this bag is comprised of the scrimless filter felt that is overlapped, forming a seam 6 sewn with stitching 7. The closed end of the bag in this embodiment is also comprised of a scrimless filter felt that is stitched at 8 to the end of the felt used for the tubular section. While FIG. 1 represents a preferred embodiment, other potential constructions, orientations, and features of bag filters may be used, such as those disclosed in U.S. Pat. Nos. 3,524,304 to Wittemeier et al.; U.S. Pat. No. 4,056,374 to Hixenbaugh; U.S. Pat. No. 4,310,336 to Peterson; U.S. Pat. No. 4,481,022 to Reier; U.S. Pat. No. 4,490,253 to Tafara; and/or U.S. Pat. No. 4,585,833 to Tafara.

In some embodiments, the closed end 2 of the filter bag, as shown in FIG. 1, is a disk of scrimless filter felt sewn to the tubular section. In some other embodiments the closed end can be made of some other material, for example in some situations a metallic closed end might be needed. In other embodiments the closed end can be ultrasonically, adhesively, or heat seamed or sealed in some other manner than sewing. In another embodiment, one end of the tubular section of the bag comprising the scrimless filter felt can be gathered together or folded, and then sealed to form the closed end. In some embodiments the open end 3 of the bag may be provided with hardware to attach the bag to the cell plate. In some other embodiments the open end of the bag may be sized such that a snug fit is accomplished by sliding the bag over a specially designed cell plate.

As used herein, the term "filter bag" is meant to include not only the generic type of filter bag disclosed in the figure, but many other different embodiments of bag filters or tubular filters, including filter pockets or envelope bags. The tubular section of the bag is not meant to be limited to only round or cylindrical tubes but also includes such things, for example, as flat tubes, which could be used for filter pockets and envelope bags.

Test Methods

Filtration efficiency was measured using procedure ASTM D 6830-02 "Standard Test Method for Characterizing the Pressure Drop and Filtration Performance of Cleanable Filter Media" and procedure VDI 3926 "Standard Test for the Evaluation of Cleanable Filter Media" using aluminum oxide dust. These are standard tests performed in the US and Europe, respectively, to determine the filtration efficiency of the felts. The higher the outlet concentration or leakage, lower the filtration efficiency. ASTM stands for the American Society for Testing and Materials.

EXAMPLE 1

An intimate staple fiber blends containing 2 denier per filament (2.2 dtex per filament) meta-aramid fiber, specifically poly(meta-phenylene isophthalamide) fiber, having a 3-inch (76 mm) cut length (available under the trademark Nomex® fiber from DuPont and 1.5 denier per filament (1.7 dtex per filament) para-aramid fiber, specifically poly(para-phenylene terephthalamide) fiber, also having a 3-inch (76 mm) cut length (also available under the trademark Kevlar® fiber from DuPont was made by combining and mixing the staple fibers from bales. Using standard carding and cross lapping equipment these staple fibers were converted into crosslapped batts and were then needle-punched several times on both sides to produce filter felts (Items 1-1 to 1-5). This was accomplished by first pre-consolidating the needlepunching the batt 600 penetrations/in$^2$ on each side, followed by additional needlepunching on both sides to further consolidate the batt. The total number of penetrations for each item, including the 1200 pre-consolidation penetrations, is shown in Table 1. To generate comparison filter felts of comparable weight, the above procedure was repeated to make heavy filter felts having a basis weight of 15.3 oz/yd$^2$ (520 g/m$^2$) from 100 percent 2 denier per filament (2.2 dtex per filament) Nomex® meta-aramid fiber (Item A). The 15.3 oz/yd$^2$ (520 g/m$^2$) felts were then carefully shaved down to remove basis weight and make 100-percent meta-aramid fiber filter felts having basis weights of 13.56 oz/yd$^2$ (460 g/m$^2$) (Item B) and 11.15 oz/yd$^2$ (380 g/m$^2$) (Item C). The felts were then evaluated for filtration efficiency using the procedure ASTM 6830-02 and the results are shown in the Table 1.

TABLE 1

| Item | Blend M/P* (%/%) | Basis Weight (oz/yd²) | Needling PPI/in² | Particle Conc** (mg/dscm) | Total Mass# (mg/dscm) |
|---|---|---|---|---|---|
| A | 100/0 | 15.30 | 4200 | 0.0392 | 0.0392 |
| B | 100/0 | 13.56 | 4200 | 0.6363 | 0.6363 |
| 1-1 | 75/25 | 13.80 | 4200 | 0.2471 | 0.2471 |
| 1-2 | 55/45 | 13.65 | 4200 | 0.0804 | 0.0804 |
| C | 100/0 | 11.15 | 4200 | 0.8506 | 0.8846 |
| 1-3 | 75/25 | 11.15 | 5700 | 0.4043 | 0.4043 |
| 1-4 | 75/25 | 10.79 | 7200 | 0.3116 | 0.3116 |
| 1-5 | 55/45 | 11.11 | 5700 | 0.2019 | 0.2301 |

*M = poly (meta-phenylene isophthalamide); P = poly (para-phenylene terephthalamide)
**Mean Outlet Particle Concentration of particles passing through the sample that have a size of 2.5 microns or less in width with units of mg/dry standard cubic meter of air.
Mean Outlet Particle Concentration Total Mass with units of mg/dry standard cubic meter of air.

Figure 2:
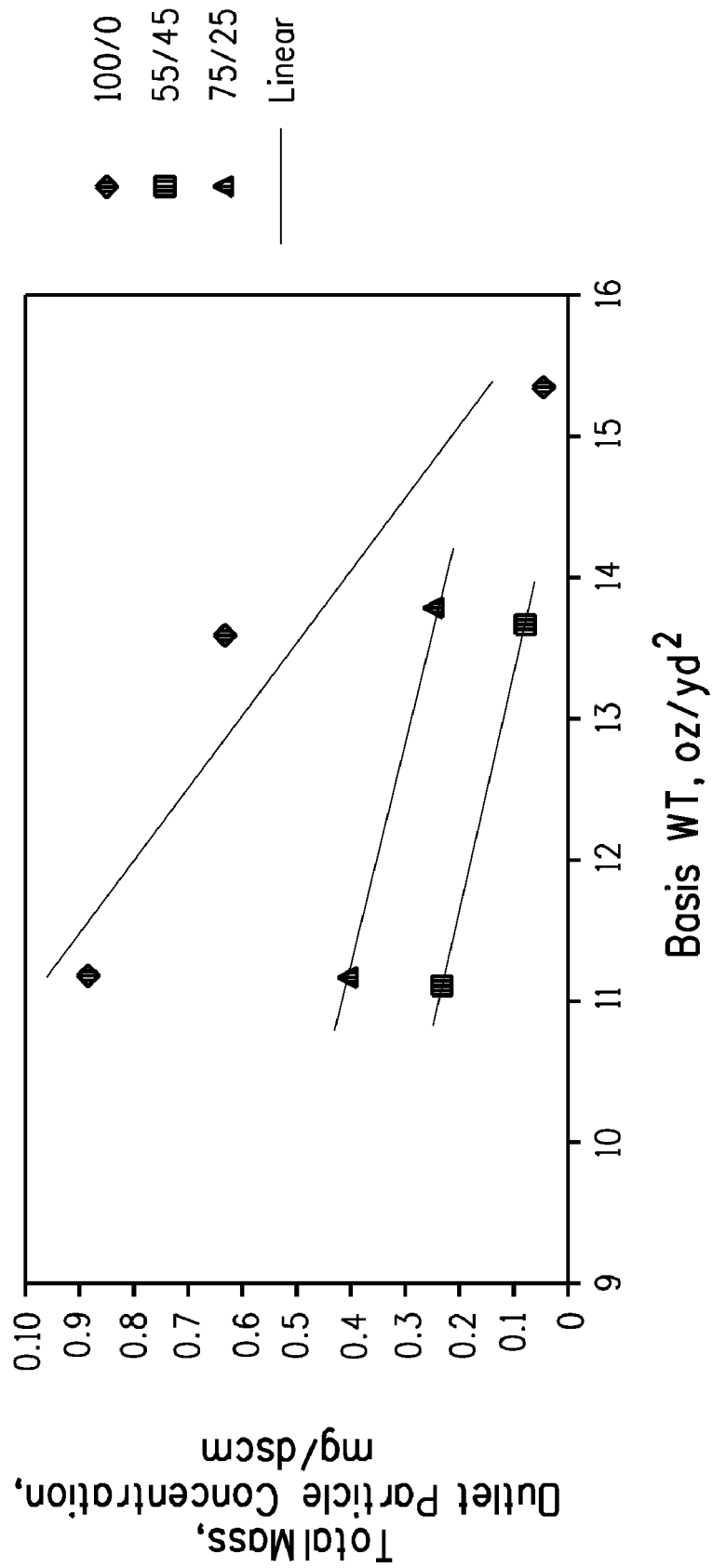
FIG. 2 presents the filtration performance data of Table 1.

As shown in Table 1 and FIG. 2, the blends provide lower mean outlet concentration or higher efficiency than 100% meta-aramid at a comparable weight. This will result in a very efficient operation of the bag house. Also this offers potential for using lower basis weight bags resulting in lower operating cost. Filter bags made from these blended aramid fiber felts will pass the current EPA emission limits for an asphalt plant and has the potential for meeting higher emission standards in the future and be able to withstand very high temperature variations, such as extended filtering of hot gases at temperatures in excess of 175 C

EXAMPLE 2

Figure 3:
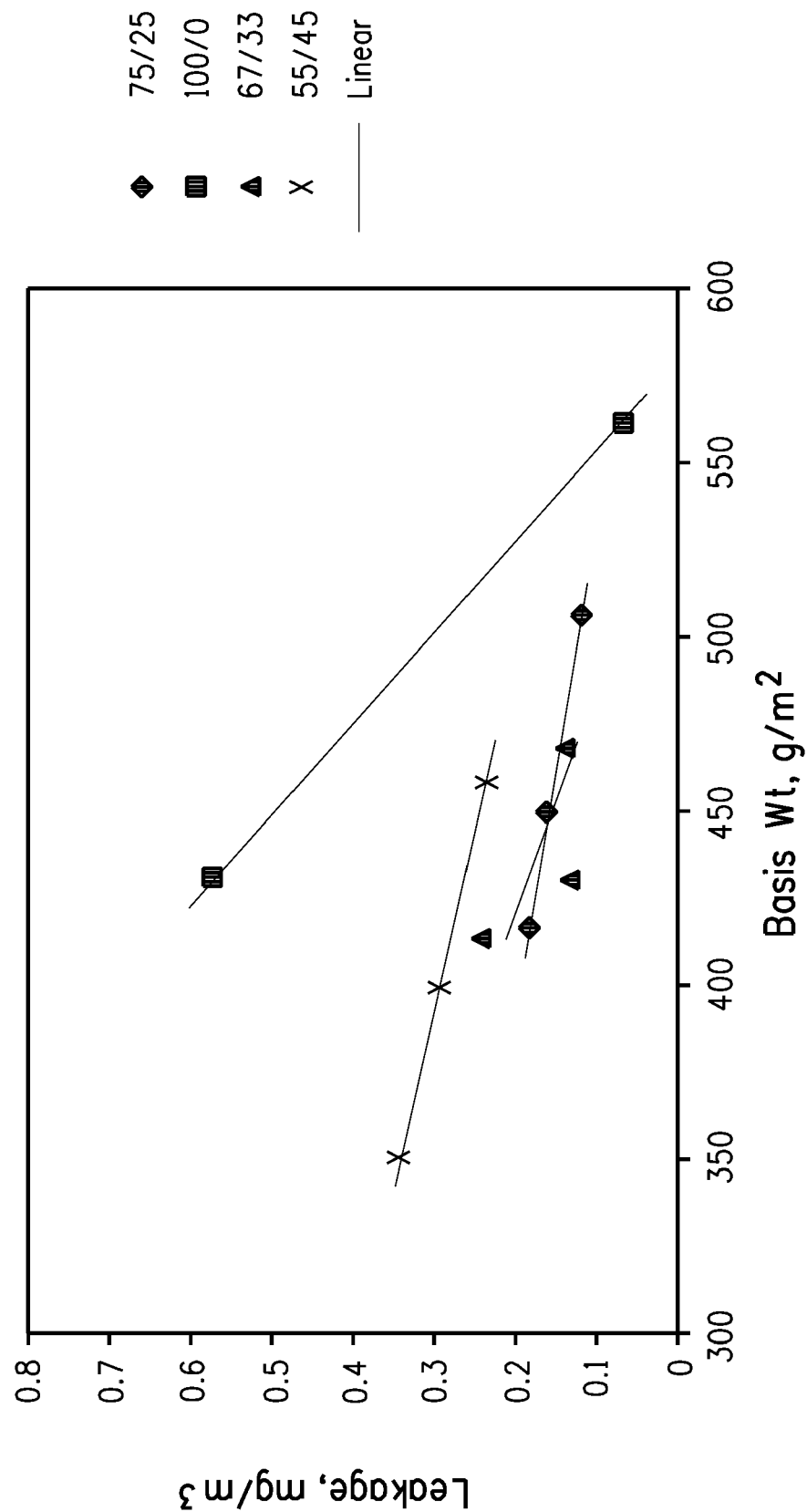
FIG. 3 presents the filtration performance data of Table 2.

Intimate staple fiber blends containing meta/para fiber blend weight ratios of 55/45, 67/33, and 75/25 of the same poly(meta-phenylene isophthalamide) fiber and poly(para-phenylene terephthalamide) fiber of Example 1 were made into scrimless filter felts as in Example 1 (Items 2-1 to 2-8). Also as in Example 1, to generate comparison filter felts of comparable weight, a 15.3 oz/yd² (520 g/m²) filter felt made from 100 percent 2 denier per filament (2.2 dtex per filament) Nomex® meta-aramid fiber was carefully shaved down to remove basis weight make two 100-percent meta-aramid fiber comparison filter felts (Items D & E). All of he felts were then evaluated for filtration efficiency using the procedure VDI 3926 and the results are shown in Table 2. The blended scrimless filter felts had significantly lower leakage than the 100% meta-aramid felt at a comparable basis weight, thus confirming the results shown with the ASTM 6830-2 procedure. FIG. 3 is an illustration of the linear fit of the data of Table 2.

TABLE 2

| Item | Blend Ratio Meta-/Para-Aramid | Total Penetrations/in² | Basis Weight g/m² | Leakage mg/m³ |
|---|---|---|---|---|
| 2-1 | 75/25 | 4200 | 505 | 0.11 |
| 2-2 | 72/25 | 5700 | 450 | 0.16 |
| 2-3 | 75/25 | 7200 | 420 | 0.18 |
| 2-4 | 67/33 | 4200 | 465 | 0.14 |
| 2-5 | 67/33 | 5700 | 430 | 0.14 |
| 2-6 | 67/33 | 7200 | 415 | 0.24 |
| 2-7 | 55/45 | 4200 | 455 | 0.24 |
| 2-8 | 55/45 | 5700 | 350 | 0.35 |
| D | 100/0 | 4200 | 430 | 0.57 |
| E | 100/0 | 4200 | 560 | 0.07 |

Any of the scrimless filter felts made in Examples 1 or 2 can be made into a bag filter. The bag filter can have a closed end, an open end, and a tubular section. The scrimless filter felt can be fashioned into a cylinder with the edges overlapping. The edges can then be attached by stitching them to form a seam 6 as shown in FIG. 1, which forms the tubular section of the filter bag. Additional scrimless filter felt can be attached to the end of the tubular section by stitching to form the closed end of the bag. If desired, a snap ring can be attached to the open end of the bag.

What is claimed is:

1. A bag filter having a tubular section, a closed end, and an open end; the tubular section comprising a scrimless filter felt consisting essentially of a needle-punched batt of an intimate blend of fibers consisting of
   a) 50 to 79 percent by weight meta-aramid staple fiber, and
   b) 21 to 50 percent by weight para-aramid staple fiber;
said needle-punched batt having a basis weight of from 10 to 17 ounces per square yard (340 to 580 grams per square meter).

2. The bag filter of claim 1, wherein the scrimless filter felt has filtration efficiency per ASTM 6830-02, as measured by the total mass of the mean outlet particle concentration through the felt, of 0.02 to 0.5 milligrams per dry standard cubic meter of air.

3. The bag filter of claim 2, wherein the scrimless filter felt has filtration efficiency per ASTM 6830-02, as measured by the total mass of the mean outlet particle concentration through the felt, of 0.05 to 0.4 milligrams per dry standard cubic meter of air.

4. The bag filter of claim 1, wherein the needle-punched batt has 4200 to 7200 total penetrations per square inch (650 to 1116 total penetrations per square centimeter).

5. The bag filter of claim 1, wherein the intimate blend of fibers consists of
   a) 50 to 68 percent by weight meta-aramid staple fiber, and
   b) 32 to 50 percent by weight para-aramid staple fiber.

6. The bag filter of claim 5, wherein the scrimless filter felt has filtration efficiency per ASTM 6830-02, as measured by the total mass of the mean outlet particle concentration through the felt, of 0.02 to 0.5 milligrams per dry standard cubic meter of air.

7. The bag filter of claim 5, wherein the scrimless filter felt has filtration efficiency per ASTM 6830-02, as measured by the total mass of the mean outlet particle concentration through the felt, of 0.05 to 0.4 milligrams per dry standard cubic meter of air.

8. The bag filter of claim 5, wherein the needle-punched batt has 4200 to 7200 total penetrations per square inch (650 to 1116 total penetrations per square centimeter).

* * * * *